Aug. 2, 1960
E. L. J. JADOUL
2,947,368
OVERLOAD RELEASE FOR ROTATABLY MOUNTED DRAWBAR
Filed Jan. 22, 1957
2 Sheets-Sheet 1
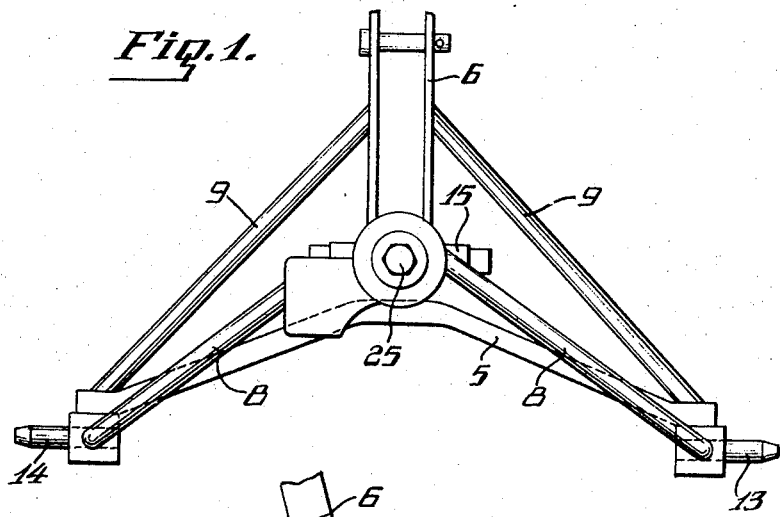
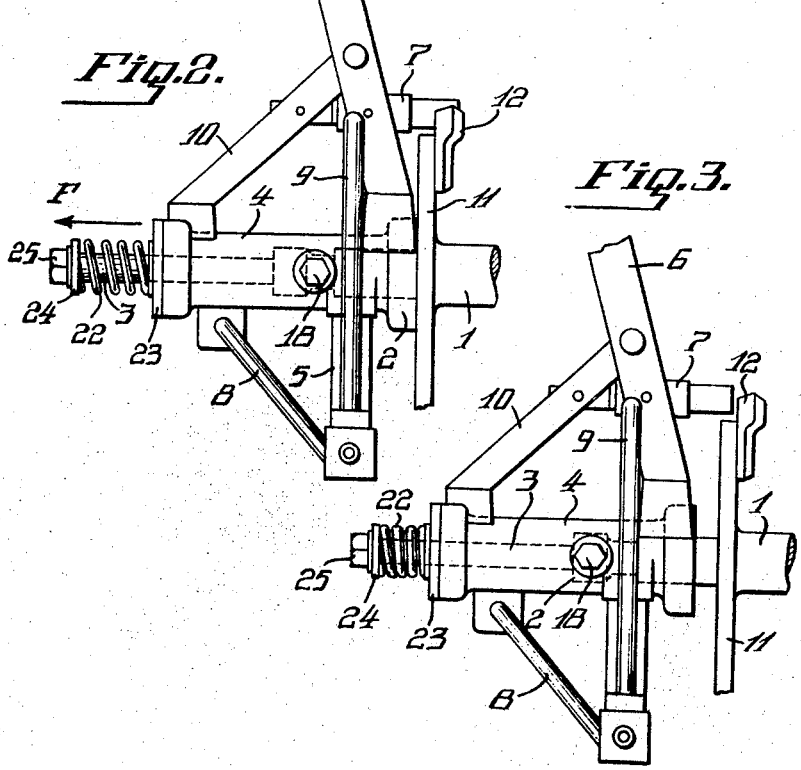
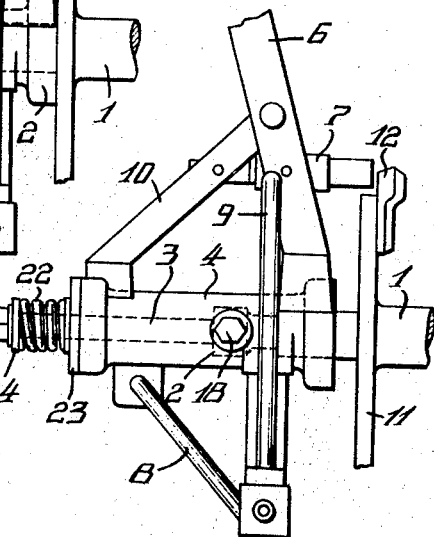
INVENTOR:
EDMOND LÉON JEAN JADOUL
by Richardson, David and Nerdon
Atty's.

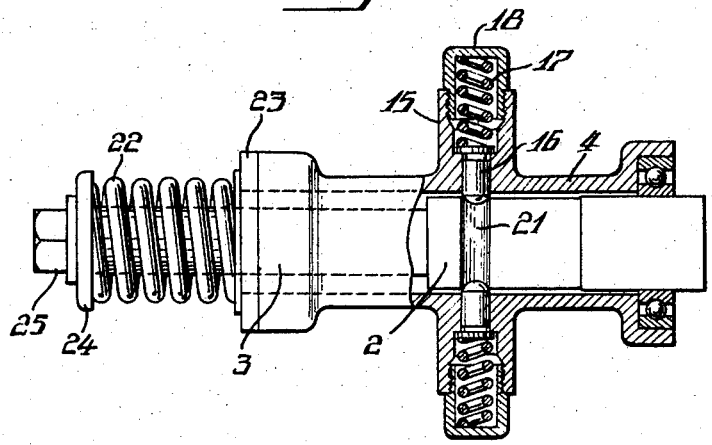
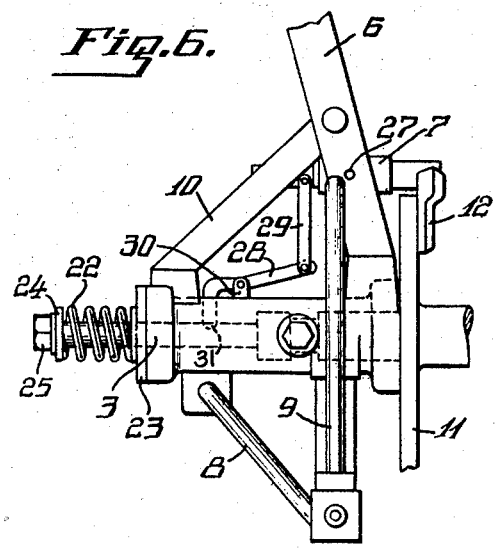
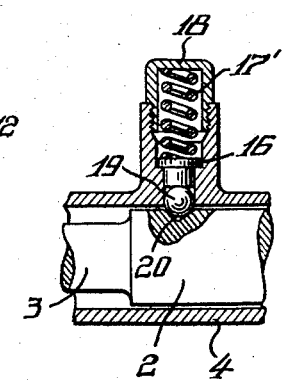

United States Patent Office 2,947,368
Patented Aug. 2, 1960

2,947,368
OVERLOAD RELEASE FOR ROTATABLY MOUNTED DRAWBAR

Edmond Leon Jean Jadoul, Sauveniere, Belgium, assignor to Charrues Melotte, Société Anonyme, Gembloux, Belgium, a Belgian company Filed Jan. 22, 1957, Ser. No. 635,502

13 Claims. (Cl. 172—264)

My present invention concerns automatic draw-gear safety devices for axially-drawn agricultural ploughs or similar tools.

Devices of this kind are known comprising push-rods or balls subjected to the action of springs adjustably stressed in such a way that, for normal work needing a given tractive force, the coupling between the tractor and the plough is fully operative, whereas in the event of an abnormal force being exerted, the plough will be freed from the tractor before the plowshare or some other element is permanently distorted or broken.

These devices, however, have the disadvantage that when disconnection of the coupling takes place, the plough remains on the ground, and afterwards the coupling must be restored by re-inserting the draw-bar extension of the plough into the bushing of the tractor, which operation is both delicate and laborious.

My present invention has as its object to remedy this disadvantage and consists in that the housing for the push-rods or balls is arranged in the periphery of the bushing and a compression spring is wound around the front end of the draw-bar extension which slides in the bushing, this spring acting in such a way that, at the moment an abnormal force is exerted, the bushing can slide sufficiently to allow the locking device which prevents rotation of the plough to be freed whilst the spring is compressed and after the rotation of the plough, under the pressure exerted by the earth on the plowshare, and its disengagement from the soil, the spring is expanded and acts on the draw-bar extension so as to cause the latter to slide back and to restore the elements to their original longitudinal position.

The drawings are intended to show how the invention may be realized in practice.

Fig. 1 is a front view, in elevation, of a fore-carriage to which the device has been fitted.

Figs. 2 and 3 are side views showing a fore-carriage fitted with the device; in Fig. 2 the parts are shown in their normal working position, and in Fig. 3 they are shown after having been released by the plough encountering some obstacle.

Fig. 4 is a view in vertical section through the bushing and the draw-bar and extension.

Figures 5 and 6 show modified forms of the device.

On the attached drawings, 1 represents the draw-bar of the plough to be protected, and 2 an extension of the drawbar 1 terminating in a thin end portion 3 which is inserted into the bushing 4.

In the example represented, the fore-carriage is of the triangulated type, such as described in copending U.S. patent application 483,044, filed January 20, 1955, now Patent No. 2,806,781, and British Patent 767,261 and comprises a cross-piece 5 in the form of a bridge, uprights 6 rigidly attached to the bushing 4, on which uprights is mounted the locking lever 7, the rods 8 joining each of the cross-piece ends to the front part of the bushing, rods 9 joining the cross-piece ends to the upper part of the uprights 6 and strengtheners 10 joining the ends of the bushing to the uprights.

Rigidly attached to the draw-bar is a plate 11 carrying lugs 12 between which the end of the locking lever 7 can slide.

The points for attachment to the tractor are shown at 13 and 14.

On the periphery of the bushing 4, and extending perpendicularly or obliquely to its axis, are one or more housings 15 containing detent devices, in which are placed either: (a) push rods 16 subjected to the action of springs 17 contained in the caps 18 which screw into the housings 15 (Figure 4) or (b) balls 19, subjected to the action of a plunger 16 on which the compressive force of the spring 17 acts, which pressure is regulated by the cap 18 (Fig. 5).

Diametrally-opposed spherical depressions 20 (Figure 5), or a circumferential groove 21 (Figure 4), are cut in the periphery of the draw-bar extension 2 and serve to lock the device against longitudinal movement of the drawbar 1.

Around the end portion 3 of the draw-bar extension 2 which slides in the bushing 4 is wound a compression spring 22 which bears, on the one hand, against a circular projection 23 provided at the end of the bushing, and on the other against a washer 24 tightened on to the draw-bar, for example by a bolt 25.

The device operates in the following manner:

The pressure of the balls 19 in the depressions 20, or that of the push-rods in the groove 21, resists a traction exerted on the draw-bar extension such that, for normal work needing a known tractive force, the apparatus does not release, and the coupling between plough and tractor fulfills all requirements.

When, as a result of engagement with a post, stump, stones, roots, etc., the plough or other tool offers a resistance to towing greater than that normally encountered; the push rods 16 are forced out of the groove 21, or the balls 19 are forced out of the spherical depressions 20.

As a result of this, the bushing 4, together with all the elements which are rigidly attached to it, can slide forwardly in the direction indicated by the arrow F (Fig. 2) with respect to the draw-bar 1 and the draw-bar extension 2, which remain fixed, by an amount which allows the bolt 7 to be freed from between the lugs 12 on the plate 11, and, at the same time, the spring 22 is compressed so that, at the end of this first stage, the assembly is in the condition indicated in Fig. 3.

At this moment, the plough ceases to be locked, and revolves through 90° under the pressure exerted by the earth on the plowshare portion, and leaves the soil.

But, as soon as the abnormal force producing this release disappears, the spring 22 expands and causes the draw-bar to be guided into the interior of the bushing so that the plate 11 may then be again brought up to the end of the bushing.

In order to restore normal conditions, it is then sufficient to raise the assembly by the hydraulic device of the tractor, bringing the plough into a vertical plane, to cause the bolt 7 to again take up its locked position.

Figure 6 shows an alternative embodiment in which the bolt 7 is mounted so as to pivot upon a shaft 27 carried by the uprights 6, and is brought into the release position by a set of levers 28—29, one of which, 28, can turn about a lug 30 rigidly mounted on the bushing 4 under the action of a depression 31 formed in the thin part 3 of the draw-bar extension. Longitudinal movement of the drawbar extension 3 forces the tip of the lever 28 out of the depression 31. This, in turn, causes downward movement of the link 29 and pivotal movement of the locking lever 7 so that the free end of lever 7 is withdrawn from between the lugs 12.

The device described has the advantage that, after the intervention of the safety device, the plough or other agricultural tool does not separate from the tractor, but the draw-bar extension remains always engaged in the bushing so that it is no longer necessary to re-insert it, which re-insertion is always a lengthy and laborious task.

What I claim is:

1. A draft attachment for a tractor-agricultural implement combination comprising a bushing mounted on the tractor, a drawbar for the agricultural implement extending through and beyond said bushing, said drawbar being slidable and rotatable in said bushing, coacting locking means on said bushing and drawbar to prevent rotation of said drawbar in said bushing, coacting latching means on said bushing and drawbar to keep said bushing and drawbar engaged under normal operating conditions, tensioning means carried by the drawbar and acting yieldingly on the bushing to keep said locking means engaged, said tensioning means being overcome under the pull of an obstruction engaged by the agricultural implement, causing relative sliding movement between said bushing and drawbar and disengagement of said coacting latching and locking means, whereby the implement may be rotated out of the path of the obstruction, said tensioning means thereupon pulling said drawbar back to its original position in the bushing and causing reengagement of said latching and locking means.

2. Apparatus according to claim 1 in which the coacting locking means comprises a stop member on the bushing and a lug projecting from the drawbar, the stop member extending into the path of the lug.

3. Apparatus according to claim 1 in which the coacting locking means comprises a pivoted stop member on the bushing and a lug projecting from the drawbar, the stop member extending into the path of the lug, and means connecting the stop member with the drawbar whereby upon relative movement between the drawbar and bushing said stop member will be pivoted out of engagement with said lug.

4. Apparatus according to claim 1 in which the coacting locking means comprises a pivoted stop member on the bushing and a lug projecting from the drawbar, the stop member extending into the path of the lug, link and lever means connecting the stop member with the drawbar whereby, upon relative motion between the drawbar and bushing, said stop member will be pivoted out of engagement with said lug.

5. Apparatus according to claim 1 in which the coacting locking means comprises a pivoted stop member on the bushing and a lug projecting from the drawbar, the stop member extending into the path of the lug, a depression in the drawbar, a bellcrank lever pivoted on the bushing and having one arm forming a detent in engagement with said depression, a link member pivoted to the stop member, said link and free arm of the bellcrank lever being joined in a pivotal connection whereby, upon relative sliding movement between the bushing and drawbar, said bellcrank lever will be actuated to cause pivotal movement of said stop member to move it out of the path of the lug.

6. Apparatus according to claim 1 in which said tensioning means comprises a spring on the free end of the drawbar, said spring being compressed between said drawbar and the bushing when an obstruction is encountered, and being extended to its original state upon passing the obstruction.

7. In a device for coupling a plough to a tractor, said plough including a drawbar, a frame adapted to be connected to said tractor, a bushing fixed to said frame, the forward end portion of said drawbar being slidably and rotatably disposed in said bushing, releasable detent means carried by said frame and holding said drawbar against rearward longitudinal movement in said bushing, said drawbar being freed by said detent means when the pull exerted on said drawbar by the tractor exceeds a predetermined normal maximum working pull, spring means yieldingly urging said drawbar forwardly in said bushing, stop means limiting said forward movement of said drawbar, and locking means holding said drawbar against rotation, said locking means being releasable by rearward movement of said drawbar in said bushing whereby said drawbar is freed for rotary movement after the pull on said drawbar has exceeded said maximum pull, said spring means, after release of said locking means, moving said drawbar forwardly in said bushing until limited by said stop means when the pull on said drawbar is sufficiently reduced.

8. A device according to claim 7, wherein said detent means includes at least one push-rod, spring means acting on said push-rod and urging one end of said push-rod into engagement with said forward end portion of said drawbar, said drawbar having a recess formed therein in which said one end of said push-rod is normally received, said recess being shaped to force said end of said push-rod out of said recess when said pull exceeds said maximum pull.

9. A device according to claim 7, wherein said detent means includes at least one ball, spring means acting on said ball and urging said ball into engagement with said forward end portion of said drawbar, said drawbar having a recess formed therein in which a portion of said ball is normally received, said recess being shaped to force said ball out of said recess when said pull exceeds said maximum pull.

10. A device according to claim 7, wherein said locking means comprises a first locking member fixed to said forward end portion of said drawbar, and a second locking member fixed to said frame, said second locking member engaging said first locking member to prevent rotation of said drawbar while said drawbar is held against rearward movement in said bushing by said detent means and being disengaged from said first locking member upon rearward movement of said drawbar in said bushing.

11. A device according to claim 10, wherein said stop means is constituted by said bushing and said first locking member, said first locking member being engageable with said bushing for limiting said forward movement of said drawbar.

12. A device according to claim 7, wherein said spring means comprises a helical compression spring surrounding the extreme forward end portion of said drawbar, said compression spring and a member fixed to forward end of said drawbar on which one end of said compression spring acts, the other end of said compression spring acting on said bushing.

13. A device according to claim 7, wherein said locking means comprises a first locking member fixed to said forward end portion of said drawbar, said first locking member comprising means defining a recess opening away from the longitudinal axis of said drawbar, a second locking member pivoted to said frame, said second locking member including a portion which is normally received in said recess for locking said drawbar against rotation, said portion of said second locking member being withdrawn from said recess upon pivotal movement of said second locking member, and releasing means connected to said second locking member and actuated by rearward movement of said drawbar in said bushing.

References Cited in the file of this patent

UNITED STATES PATENTS

| 275,146 | Clark | Apr. 3, 1883 |
| 444,986 | Bloominger | Jan. 20, 1891 |

FOREIGN PATENTS

| 526,098 | Belgium | Feb. 15, 1954 |
| 954,552 | France | June 13, 1949 |
| 1,010,348 | France | Mar. 19, 1952 |
| 1,082,279 | France | June 16, 1954 |
| 859,975 | Germany | Dec. 18, 1952 |
| 767,261 | Great Britain | Jan. 30, 1957 |